US010235907B2

(12) United States Patent
Scorpio-Pappin et al.

(10) Patent No.: US 10,235,907 B2
(45) Date of Patent: Mar. 19, 2019

(54) INFORMATION BAND

(71) Applicant: Vagaband Limited, London (GB)

(72) Inventors: Robin Dale Scorpio-Pappin, London (GB); Walker Thaddeus Pappin, London (GB); Edmund Januarius Bassett, London (GB)

(73) Assignee: Vagaband Limited, London (GB)

( * ) Notice: Subject to any disclaimer, the term of this patent is extended or adjusted under 35 U.S.C. 154(b) by 0 days.

(21) Appl. No.: 15/741,934

(22) PCT Filed: Jul. 7, 2016

(86) PCT No.: PCT/GB2016/052048
§ 371 (c)(1),
(2) Date: Jan. 4, 2018

(87) PCT Pub. No.: WO2017/006123
PCT Pub. Date: Jan. 12, 2017

(65) Prior Publication Data

US 2018/0204486 A1 Jul. 19, 2018

(30) Foreign Application Priority Data

Jul. 8, 2015 (GB) .................................. 1511965.4

(51) Int. Cl.
*G06F 3/00* (2006.01)
*G09F 3/00* (2006.01)
*G09F 21/02* (2006.01)

(52) U.S. Cl.
CPC ............ *G09F 3/005* (2013.01); *G09F 3/0289* (2013.01); *G09F 21/02* (2013.01)

(58) Field of Classification Search
CPC ............................... G09F 3/005; G09F 3/0289
See application file for complete search history.

(56) References Cited

U.S. PATENT DOCUMENTS

| | | | | |
|---|---|---|---|---|
| 3,771,717 | A * | 11/1973 | McDermott ....... | G07C 9/00015 235/487 |
| 3,946,508 | A * | 3/1976 | Booras ...................... | G09F 1/04 229/71 |
| 4,984,683 | A * | 1/1991 | Eller .................... | A44C 25/004 206/38 |
| 5,311,689 | A | 5/1994 | Lindsey | |
| 7,520,074 | B1 | 4/2009 | Vanova | |
| 2001/0002753 | A1* | 6/2001 | Hollwarth-Oberholz .................... | G09F 3/0288 283/81 |
| 2003/0006608 | A1 | 1/2003 | Seawright | |

(Continued)

FOREIGN PATENT DOCUMENTS

WO 20060123286 A1 11/2006

OTHER PUBLICATIONS

International Search Report and Written Opinion for PCT/GB2016/052048, dated Jan. 12, 2017, 10 pgs.

*Primary Examiner* — Gary C Hoge
(74) *Attorney, Agent, or Firm* — Michael A. Bondi; Moss & Barnett

(57) ABSTRACT

A band for wrist, or other part of a limb, comprises a band and an information sheet, for important information. The latter displays written or printed information and can be folded up under the band so that when worn it is held in place between the strap and limb. The information is also kept from view in that position.

19 Claims, 2 Drawing Sheets

(56) References Cited

U.S. PATENT DOCUMENTS

| | | | | |
|---|---|---|---|---|
| 2009/0193847 | A1 | 8/2009 | Scott | |
| 2012/0272587 | A1 * | 11/2012 | Papierowski | E06B 5/16 52/105 |
| 2014/0254142 | A1 | 9/2014 | Ward | |

* cited by examiner

INFORMATION BAND

FIELD OF THE INVENTION

The present invention concerns a band on which important information can be carried by a person.

BACKGROUND OF THE INVENTION

Some persons with medical conditions carry medical ID bracelets, often made of metal, with important medical information and contact numbers engraved on them. This can be useful to medical practitioners, if for example the person is found unconscious. In one version of the device the band has a QR code that medical practitioners can scan to be given access to the wearer's medical information held in a central database.

A more recent device is a watch-like bracelet with the body being an electronic monitor for recording personal activity for fitness purposes and also for monitoring sleep.

SUMMARY OF THE INVENTION

The present invention provides a band for carrying information, comprising a strap that closes around a limb of a user of the band, and a foldable information sheet, the information sheet being attached to the strap.

The information may be foldable to be retained in position by the strap and limb when worn. The information sheet may be foldable under the strap when worn.

The information sheet may comprise an information area, which is hidden when the information sheet is folded and the band is worn.

The information sheet may be sewn or adhered to the strap. Alternatively, the information sheet may be integral to the strap.

The strap may have a length, and the folds may be parallel to the length of the strap.

The information sheet may have alternate forward and backward folds.

The information sheet may comprise two or more folds, or two to five folds, or ten to fourteen folds.

The information sheet may have a reinforced portion in a position spaced from the strap. The information sheet may fold so that the reinforced portion covers the information sheet when in a folded position. The information sheet may have a tear-resistant portion in a position spaced from the strap. The information sheet may fold so that the tear-resistant portion covers the information sheet when in a folded position.

The band may be a wristband, or armband, or an ankle band, or a leg band.

The present invention also provides a kit comprising the band for displaying information and a writing implement for writing on the information sheet.

DESCRIPTION OF THE DRAWINGS

Embodiments of the present invention will now be described, by way of example only, with reference to the accompanying drawings, of which.

DETAILED DESCRIPTION

Figure 1:
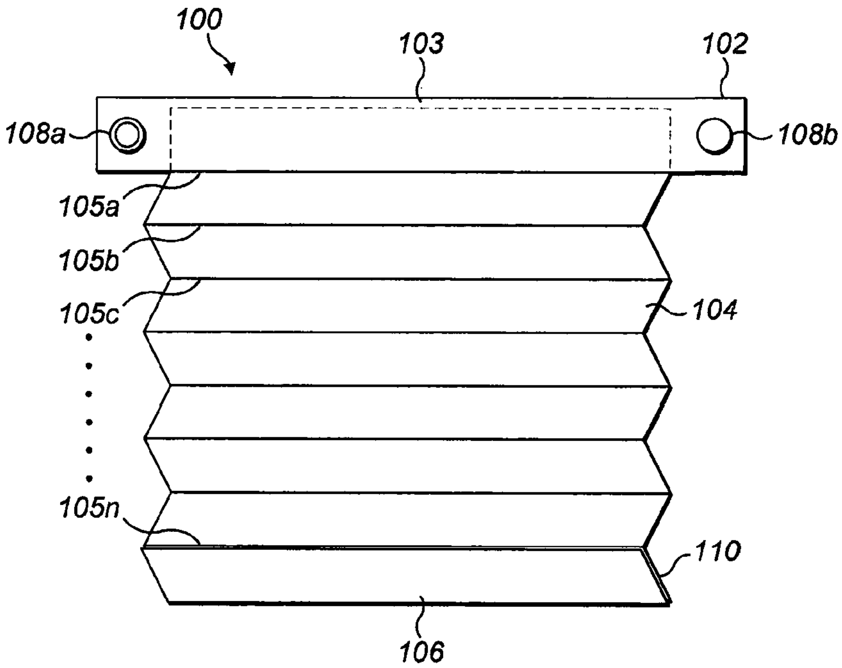
FIG. 1 shows a band for displaying information according to a first embodiment of the invention.

A band 100, for example a wristband for carrying information in accordance with a first embodiment of the invention is shown in FIG. 1. The wristband 100 comprises a strap 102, with cooperating fasteners 108*a*, 108*b* at opposite ends of the strap 102.

An information sheet 104 is attached to the strap 102 along a first side 103 of the information sheet 104. In the present embodiment, the information sheet 104 is sewn to the strap 102, while in other embodiments the information sheet 104 is attached using an adhesive. In yet further embodiments (not shown), the information sheet 104 is attached to the strap 102 at a middle portion or off-centre portion of the information sheet 104. The information sheet can be used by the wearer to bear information important to them, or someone who needs to help them.

In the present embodiment the information sheet 104 has a set of equidistant concertina folds 105*a-n* (i.e. folds that are alternately in opposing front/back directions, i.e. in a zig-zag fashion), which are folded in a direction parallel to the length of the strap and which delineate a set of segments of the information sheet which are the same size and shape. In the present embodiment, the segments have the same width as the strap 102. The first segment of the information sheet, at the first side 103, is overlapped by the strap (as shown by the dotted line), and the sewing (not shown) between the information sheet and the band is in a rectangle just inside the area of overlap.

By providing more folds (assuming no change in the width of the segments) a greater area can be provided on the information sheet.

One fold provides just a simple flap that can be folded out from under the strap.

Two folds provide two segments (including any tear resistant portion as mentioned below) that can be folded out from under the strap so providing twice the area.

Ten to fourteen folds and especially twelve folds have been found to provide a good sized area. For example a person travelling for several months may wish to provide many details of their contacts, details of their medical conditions and medication, their itinerary and so on. More than fourteen folds has been found to make the folded band rather thick.

A band of two to five folds has also been determined to be particularly useful, for example, for use in disaster or aid situations; here the wearers are those people needing help and they or the aid or rescue workers will want to provide just basic information for identification, processing of the wearer etc. The smaller size at the same time reduces the packing size and weight so that large numbers of the bands can be easily transported to where they are needed.

In other embodiments other set of folds are used such as letter folds, French folds or any other combination.

A tear-resistant portion 106 extends from a second side 110, opposite the first side, of the information sheet 104, in this embodiment, to the last fold 105*n*, and so is spaced from the strap by an area of the information sheet. The tear-resistant portion comprises a reinforcement strip as well as the last segment of the information sheet, which overlap and which are sewn together. The sewing (not shown) between the information sheet and the reinforcement strip is in a rectangle just inside the area of overlap.

In the present embodiment, the information sheet 104 is made of 75 gsm Polyart™ paper, manufactured by Arjobex. The strap 102 and the reinforcement strip are made of 100 gsm Polyart™ paper. The information sheet is thinner so a large sheet can be accommodated folded up while remaining compact. (Note that adhesives do not work well with Polyart™; the sewing method of joining pieces is therefore preferred.)

In other embodiments the information sheet is integral with the strap, with the information sheet and strap being cut from a single piece of material.

Figure 2:
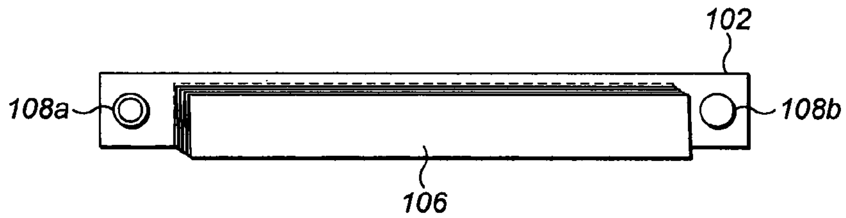
FIG. 2 shows the band according to the first embodiment in a folded configuration.

FIG. 2 shows the band 100 according to the first embodiment of the invention in a folded position. In this folded position, the information sheet 104 is substantially housed between the strap 102 and the tear-resistant portion 106, which protects the information sheet 104 from wear and tear. (Preferably, both the strap and reinforcement strip are to the outside of the segment of the information sheet to which they are attached.)

Figure 3:
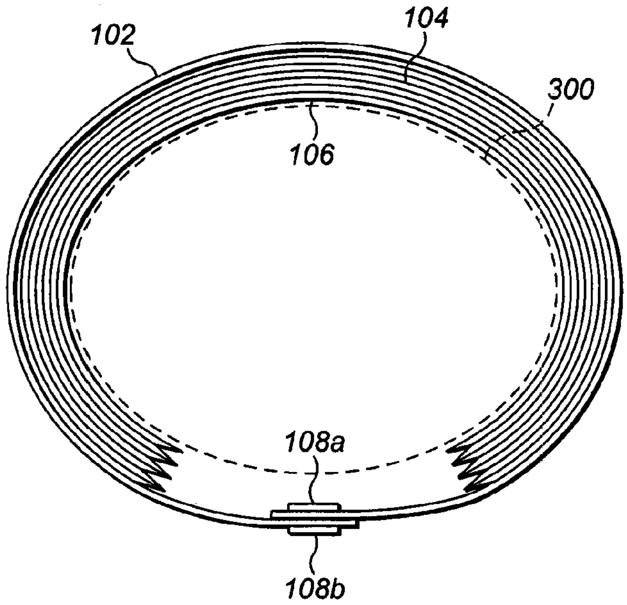
FIG. 3 shows the band according to the first embodiment in a closed configuration.

FIG. 3 shows the band 100 according to the first embodiment of the invention in a closed position, being worn on a limb 300 of a user of the band (shown in section with a dotted outline). In this configuration the band 100 is held closed by the fasteners 108*a*, 108*b*, which cooperate to hold the ends of the strap together. While in the present embodiment the fasteners 108*a*, 108*b* are button poppers, in other embodiments the fasteners are clasp mechanisms, adhesive mechanisms, hook-and-loop fasteners or any other fastening mechanisms known in the art. The band 100 may be closed around the wrist, arm, leg or ankle of a user.

Different sizes of wrist, etc., can be accommodated by proving the strap in different lengths, or by providing a fastener that allows the length to be adjusted.

In other embodiments (not shown) there are no fasteners per se but the ends are joined by a piece of elastic that allows the band to be put on and taken off, whilst keeping the strap sufficiently tight.

In the closed position, the information sheet 104 is located on the inside, i.e. between the strap 102 and the limb 300 of the user. In this configuration, the information sheet 104 is held in place by the strap 102 and the limb 300, and is protected by the strap, without the need for a further fastening mechanism to hold it there.

After closing the band, the band 100 may be reopened and unfolded in order to view the information displayed on the information sheet 104. The information sheet may bear important medical information, such as allergies, medical conditions, blood type, any other medical information, details of the user such as age, name and nationality, contact numbers in case of emergency and any other important information. The information may be printed or written on the information sheet by the user of the band 100. In the event of an emergency the information carried on band 100 can be used as an aid to medical staff treating a user of the band 100. A pen, or other writing implement, for writing on the information sheet may be provided with the band 100 as a kit.

Biro and pencils, for example, are appropriate for writing on the exemplary Polyart™ paper. In general a waterproof ink will have the advantage of being more resistant to smudging or washing away if the band is exposed to water, which, of course, could well happen in use.

The invention claimed is:

1. A band for carrying information, comprising a strap that closes around a limb of a user of the band, and a foldable information sheet, the information sheet being attached to the strap, wherein the information sheet is foldable under the strap when worn.

2. The band according to claim 1 wherein the information sheet is foldable to be retained in position by the strap and limb when worn.

3. The band according to claim 1, wherein the information sheet comprises an information area, which is hidden when the information sheet is folded and the band is worn.

4. The band according to claim 1, wherein the information sheet is sewn to the strap.

5. The band according to claim 1, wherein the information sheet is integral with the strap.

6. The band according to claim 1, wherein the strap has a length, and the folds are substantially parallel to the length of the strap.

7. The band according to claim 1, wherein the information sheet has alternate forward and backward folds.

8. The band according to claim 1, wherein the information sheet comprises two or more folds.

9. The band according to claim 1, wherein the information sheet comprises two to five folds.

10. The band according to claim 1, wherein the information sheet comprises ten to fourteen folds.

11. The band according to claim 1, wherein the information sheet has a reinforced portion in a position spaced from the strap.

12. The band according to claim 11, wherein the information sheet folds so that the reinforced portion covers the information sheet when in a folded position.

13. The band according to claim 1, wherein the information sheet has a tear-resistant portion in a position spaced from the strap.

14. The band according to claim 13, wherein the information sheet folds so that the tear-resistant portion covers the information sheet when in a folded position.

15. The band according claim 1, wherein the band is a wristband.

16. The band according to claim 1, wherein the band is an armband.

17. The band according to claim 1, wherein the band is an ankle band.

18. The band according to claim 1, wherein the band is a leg band.

19. A kit comprising a band for displaying information according to claim 1 and a writing implement for writing on the information sheet.

* * * * *